United States Patent [19]
von Bergen et al.

[11] Patent Number: 5,374,208
[45] Date of Patent: Dec. 20, 1994

[54] SHIP, IN PARTICULAR DEEP DRAFT VESSEL HAVING CONCENTRIC, CONTRA-ROTATING PROPELLERS

[75] Inventors: Ernst-Peter von Bergen, Ahlefeld; Günter Pietsch, Hamburg, both of Germany

[73] Assignee: Blohm+Voss AG, Hamburg, Germany

[21] Appl. No.: 129,850

[22] Filed: Sep. 30, 1993

[30] Foreign Application Priority Data

Sep. 30, 1992 [DE] Germany ............................. 4232753

[51] Int. Cl.⁵ ............................................. B63H 5/10
[52] U.S. Cl. ................................ 440/80; 277/3; 277/59; 416/174; 440/83
[58] Field of Search .............................. 441/80, 81, 83; 416/174, 128, 129 R, 129 A; 277/3, 58, 59; 184/6.22, 6

[56] References Cited

U.S. PATENT DOCUMENTS

| | | | |
|---|---|---|---|
| 3,413,008 | 11/1968 | Greiner | 416/174 |
| 3,625,523 | 12/1971 | Gardner et al. | 416/174 X |
| 4,413,829 | 11/1983 | Pietsch | 277/59 X |
| 4,793,773 | 12/1988 | Kinouchi et al. | 416/129 |
| 4,984,811 | 1/1991 | Kuwabara et al. | 440/83 X |

FOREIGN PATENT DOCUMENTS

| | | | |
|---|---|---|---|
| 1901620 | 8/1969 | Germany . | |
| 0134396 | 6/1987 | Japan | 440/81 |
| 4011597 | 1/1992 | Japan | 440/80 |

*Primary Examiner*—Sherman Basinger
*Attorney, Agent, or Firm*—Nils H. Ljungman & Associates

[57] ABSTRACT

A ship, in particular a deep-draft vessel configured for travel on the oceans or great lakes, can have a hull with two concentrically rotating propeller shafts passing through the hull, and rotate in opposite directions to one another. The ship will generally have seals between the propeller shafts, and between the propeller shafts and the hull. In general, it is necessary to lubricate and cool the sealing surfaces of the individual seals, so that the useful life of the individual seals is prolonged, and the risk of failure of the seals is reduced. For the effective lubrication of highly-stressed seals of propeller drive systems for ships with two concentric propellers rotating in opposite directions, a forced feed lubrication system with circulating lubricating oil has been found to be advantageous.

11 Claims, 8 Drawing Sheets

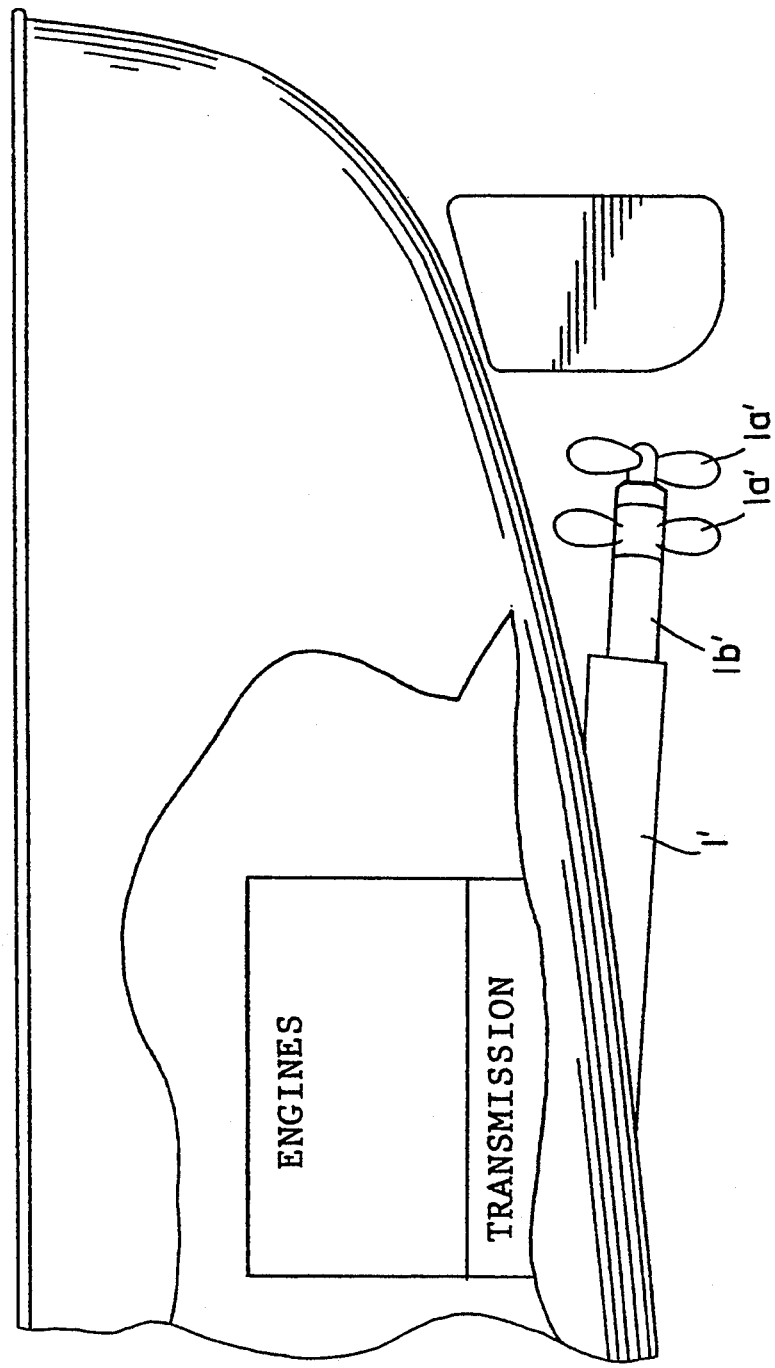

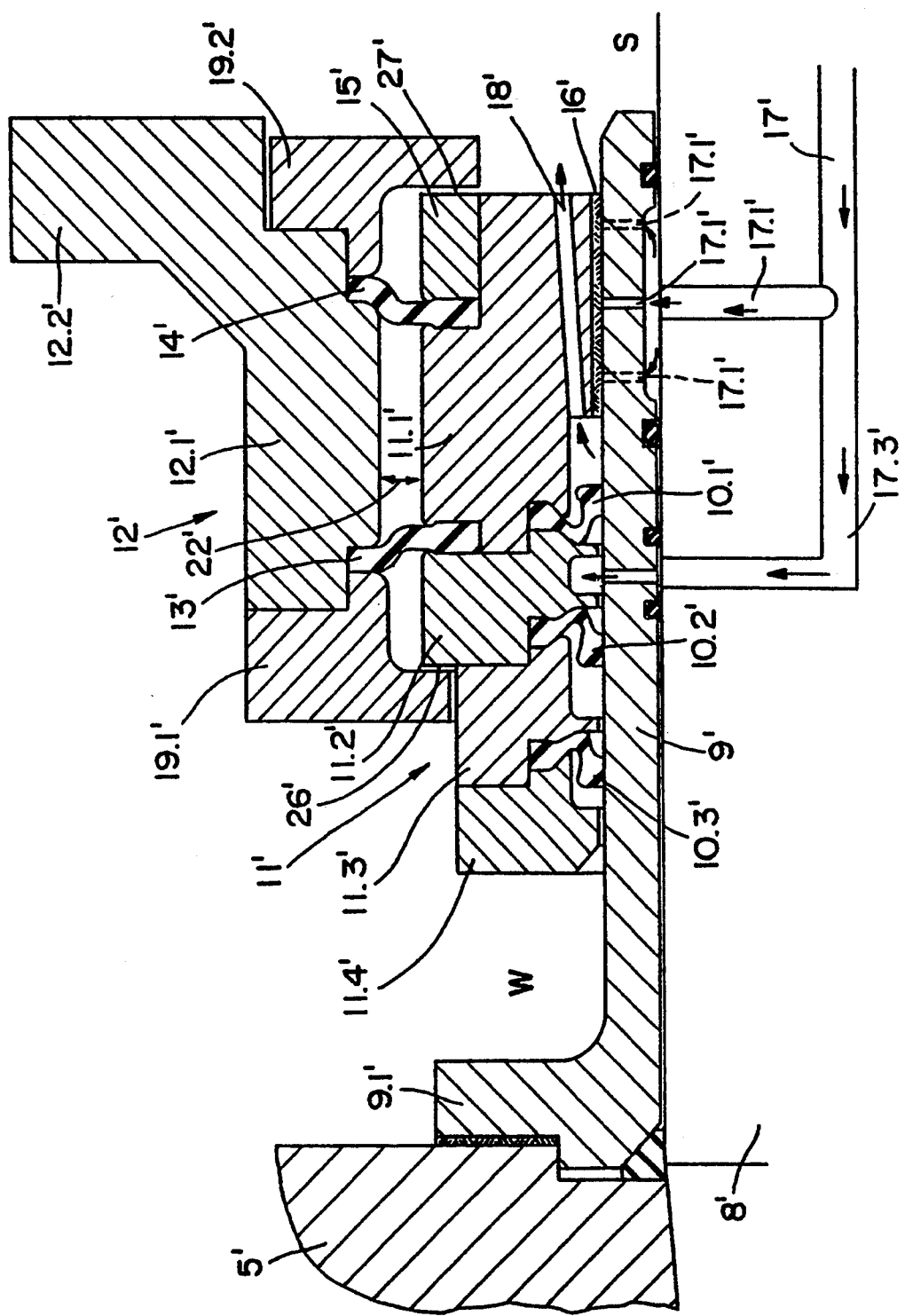

SHIP, IN PARTICULAR DEEP DRAFT VESSEL HAVING CONCENTRIC, CONTRA-ROTATING PROPELLERS

BACKGROUND OF THE INVENTION

1. Field of the Invention

This invention generally relates to a ship, in particular a deep-draft vessel configured for travel on the oceans or great lakes. Such a ship generally has a hull, and can be configured to have an engine disposed within the hull. A propeller shaft, connected to the engine at one end thereof, can then be disposed to pass through the hull of the ship into the surrounding water, at which end of the shaft at least one propeller can be mounted. With such a configuration, it is generally necessary to provide some sort of seal about the propeller shaft to seal out the surrounding water, and seal in any lubricants which may be disposed about the propeller shaft within the ship. Further, such a ship may be outfitted with two concentrically rotating propeller shafts, which rotate in opposite directions to one another. Such a configuration would therefore also generally need an additional seal between the two concentric shafts. In general, it is necessary to lubricate and cool the sealing surfaces of the individual seals, so that the useful life of the individual seals is prolonged, and the risk of failure of the seals is reduced.

2. Background Information

One type of seal which has been found to be useful for propeller shafts, is a lip seal, wherein the seals are circumferentially disposed about the propeller shafts, with a lip portion disposed in engagement with the outer surface of the propeller shaft.

Several types of lubricating systems are known for providing lubricating oil to the vicinity of the seal lips. However, in the lubrication systems, as disclosed by U.S. Pat. No. 4,793,773 and also by German Laid Open Patent Application No. 1,901,620 (which claims priority from a U.S. patent application filed on Feb. 6, 1993 having Ser. No. 703,323, the lubricating oil feed to the seals-does not take place by means of a separate forced feed lubrication, but only by means of the lubrication system for the shaft bearings, so that the lubricating oil gets to the seals only after passing the bearings, that is, essentially unpressurized.

To one skilled in the art, it becomes readily apparent that when such seals are subjected to extreme stresses, such a lubrication system is not capable of effectively lubricating and simultaneously cooling the sealing surfaces of all of the individual seals, so that the useful life of the individual seals can essentially be shortened, thereby increasing the danger of leaks or failure of the individual seals, and thus of the escape of lubricating oil into the surrounding water.

In addition, in seal arrangements for concentric propeller shafts, such as the arrangement as disclosed by German Laid Open Patent Application No. 1,901,620, a problem can arise as a result of the fluctuations of the clearance between the inner and outer shafts in the vicinity of the inner shaft seal. Thus, a correct seal can generally not be guaranteed, because either excessive pressure is applied to the seal lips fastened rigidly to the outer shaft, thus compressing the seal lips, or insufficient pressure is applied to the seal lips, thus adversely affecting the ability of the seal lips to seal out water, or seal in lubricants.

OBJECT OF THE INVENTION

The object of the invention is to improve lubrication systems of the seal arrangements as described above so that the above-mentioned disadvantages are eliminated, and in particular to meet the requirements for preventing pollution of sea water.

SUMMARY OF THE INVENTION

This invention generally relates to a lubrication system for seals of propeller drive systems for ships with two propellers concentric to one another and rotating in opposite directions, which seals can be designated as "contra-rotating seals". The outer shaft seal is preferably connected to the stern tube of the ship, while the inner shaft seal is preferably connected to the hub of the outer propeller in a water-tight manner. Both of the seals can then preferably be provided with lubricating oil from a central oil reservoir.

The present invention teaches that the object can be achieved by means of a separate, forced feed, lubricating oil transport system for the seals, in particular, if the seals are designed, each with at least three individual seals at some distance from one another in the axial direction. Such seals can preferably be lip seals. The lubricating oil supply can be designed as a separate, forced feed lubrication, preferably having a feed line coming from the pressure source and extending through the outer shaft seal housing, and emptying into at least one of the annular spaces between two adjacent individual seals of the outer shaft seal. From the outer shaft seal, preferably an additional feed line hole can run from the above mentioned annular space, through the outer shaft, or a shaft bushing corresponding to the outer shaft, and the hub of the outer propeller, to preferably empty into at least one annular space between two adjacent individual seals of the inner shaft seal. From the inner shaft seal, there can preferably be a return line hole which runs back through the hub of the outer propeller and the outer shaft, or the shaft bushing corresponding to the outer shaft, and preferably, essentially oriented diametrically to the feed line hole. The return line hole preferably extends from the above-mentioned annular space of the inner shaft seal, into preferably another annular space between neighboring individual seals of the outer shaft seal, that is, preferably an annular space different from the first annular space mentioned above. An additional return line portion can then extend from the annular space between the seals of the outer shaft seal, and through the outer shaft seal housing and the stern tube back to the pump.

As a result of this method of transporting the lubricating oil, the individual seals are sufficiently lubricated, even under extreme loads, independently of the bearing lubricating oil, with their own lubricating oil which is under pressure.

It is also advantageous that the pressure and, if necessary, the temperature of the seal lubricating oil can be adjusted independently of the bearing lubricating oil, and thus adapted to suit the current conditions of the outside water.

Several advantageous embodiments of the present invention are outlined herebelow. The individual seal configuration can De adapted to be suitable in particular for large shaft diameters, wherein the outer shaft seal can preferably be designed as a quadruple seal with two individual seals facing the outside water to be sealed out, and two individual seals facing the bearing lubricating oil chamber to essentially seal in bearing oil, and the inner shaft seal is designed as a triple seal with two individual seals facing the outside water to be sealed out, and one individual seal facing the bearing lubricating oil chamber.

Alternatively, one configuration of the present invention increases protection against the discharge of lubricating oil into the sea water by interposing at least two individual seals between the annular gap transporting the pressurized oil and the external water, to reliably reduce the pressure. As such, the first annular space of the outer bearing can preferably be located with two seal pairs on either side thereof. The annular space can preferably be located between the individual seal facing the bearing lubricating oil chamber and the adjacent individual seal facing the water to be sealed out, thereby resulting in two seals disposed on the water side. The second annular space of the outer seal can preferably be located between the two individual seals facing the inside of the ship, or facing the bearing lubricating oil chamber.

A further alternative embodiment makes possible a simple control of the lubricating oil in terms of pressure, temperature and filtration. In this embodiment, the pressure source can preferably be designed as a pump, and a ventilated elevated reservoir can preferably be connected to the pump on the pressure side, and a ventilated storage tank can preferably be connected to the pump on the suction side.

In addition to the above lubrication system for the seals, in order to overcome any problems resulting from fluctuations between the two shafts, which could excessively compress the seal lips, or alternatively result in a situation wherein the seal lips where insufficiently pressed against the shaft to provide an adequate seal, the inner shaft seal can preferably be supported by a housing ring, which in turn is preferably connected to the stern tube of the outer shaft in a fluid-tight manner. The stern tube of the outer shaft can preferably have a supporting ring disposed thereabout and concentric to the housing ring. This supporting ring represents a connecting element for a fluid-tight connection to the external shaft. The housing ring can be connected to the supporting ring, and can be maintained at a radial distance from the supporting ring, by means of at least one elastic ring wall disposed therebetween. Such elastic ring walls can prevent fluid penetration between the shafts.

As a result of this floating arrangement of the seal, major changes in the shaft clearance are essentially no longer transmitted directly to the seals, but are only indirectly transferred, via the elastic ring walls. Therefore, with such an arrangement, changes in shaft clearance due to fluctuations can be largely eliminated.

In a further alternative embodiment of the invention, when an inner shaft seal is used, whose individual seals are mounted by such a floating arrangement of a block of housing rings, connected by means of the elastic ring-shaped walls with a supporting ring fastened to the hub of the outer shaft, the feed line to the annular space of the inner seal, between the housing ring block and the supporting ring can preferably be bridged by means of a watertight hose.

A further, simple and effective solution for the watertight connection of the ring walls to each of the housing ring and the supporting ring can be provided by clamping the edges of the ring walls between adjacent ring elements, or clamping rings.

An even more extensive compensation of clearance fluctuations can be achieved by providing the housing ring with an axial extension for supporting a friction bearing. This friction bearing can work together with the inner shaft or with a bearing bush pulled onto the inner shaft. The housing ring and thus the lip seals can then be guided by the friction bearing, and may then essentially be subjected only to the comparatively small clearance generated by the friction bearing.

Additional embodiments of the present invention provide advantageous solutions for preventing axial excursions of the housing ring and thus of the lip seals. One simple solution for preventing any axial excursions of the housing ring can be achieved by means of a guide. One type of guide can preferably be configured as a ring-shaped groove, or hole, in the supporting ring, into which groove, or hole, a corresponding projection of the housing ring can project. A second type of guide can be provided by a ring-shaped groove, or hole, in the housing ring in the vicinity of the friction bearing. The inner shaft can then be provided with a bearing bush which projects into the groove of the housing ring.

The seal arrangement according to the present invention is also adaptable to the increased requirements for a reliable seal at high pressures of the medium to be sealed out, as well as the requirements relating to operational safety and reliability and environmental protection. This can be done by providing a multiple lip seal with two or more lip seals located behind one another and at some distance from one another in the axial direction of the shaft. The housing ring can then preferably be made up of a block of partial housing rings, and one lip seal can preferably be braced between each two partial housing rings.

The present invention also provides a simple means to effectively lubricate the friction bearing, as well as the lip seals with oil. By means of an arrangement according to the present invention, a lubricant caused to circulate by means of a pressure can be provided for the friction bearing. For this purpose, an oil feed to the friction bearing can be provided by means of a lubrication passage disposed inside the inner shaft, and an oil return passage can be provided in the housing ring for providing a return flow of the lubricating oil.

One aspect of the invention resides broadly in a ship. The ship comprises: a deep-draft hull configured to be borne by water; engine apparatus disposed within the hull; inner and outer propeller shafts disposed concentrically to one another and passing through the hull; transmission apparatus for connecting each of the inner and outer propeller shafts to the engine apparatus, the transmission being configured for rotating the inner and outer propeller shafts in opposite directions during a forward propulsion of the ship; at least a first seal device for sealing between the outer propeller shaft and the hull to provide a substantially fluid-tight seal between the outer propeller shaft and the hull; the first seal device comprising a plurality of first seal elements disposed about the outer propeller shaft; each of the plurality of first seal elements being disposed in contact with the outer propeller shaft in spaced apart relationship with at least one other of the first seal elements; at least two of the plurality of first seal elements being disposed to define at least one intermediate space therebetween; at least a second seal device for sealing between the inner and outer propeller shafts to provide a fluid-tight seal between the inner and outer propeller shafts; the second seal device comprising a plurality of second seal elements disposed about the inner propeller shaft; each of the plurality of second seal elements being disposed in contact with the inner propeller shaft in spaced apart relationship with at least one other of the second seal elements; at least two of the plurality of second seal elements being disposed to define at least one intermediate space therebetween; and apparatus for supplying lubricating oil into at least one of: the at least one intermediate space formed between the at least two of the plurality of first sealing elements; and the at least one intermediate space formed between the at least two of the plurality of second sealing elements.

Another aspect of the invention resides broadly in a propeller assembly for a deep draft ship. The deep draft ship has a hull for being borne by water, and the propeller assembly comprises: inner and outer propeller shafts disposed concentrically to one another and passing through the hull; at least first seal device for sealing between the outer propeller shaft and the hull to provide a substantially fluid-tight seal between the outer propeller shaft and the hull; the first seal device comprising a plurality of first seal elements disposed about the outer propeller shaft; each of the plurality of first seal elements being disposed in contact with the outer propeller shaft in spaced apart relationship with at least one other of the first seal elements; at least two of the plurality of first seal elements being disposed to define at least one intermediate space therebetween; at least second seal device for sealing between the inner and outer propeller shafts to provide a fluid-tight seal between the inner and outer propeller shafts; the second seal device comprising a plurality of second seal elements disposed about the inner propeller shaft; each of the plurality of second seal elements being disposed in contact with the inner propeller shaft in spaced apart relationship with at least one other of the second seal elements; at least two of the plurality of second seal elements being disposed to define at least one intermediate space therebetween; and apparatus for supplying lubricating oil into at least one of: the at least one intermediate space formed between the at least two of the plurality of first sealing elements; and the at least one intermediate space formed between the at least two of the plurality of second sealing elements.

One additional aspect of the invention resides broadly in a method for lubricating seal elements of counter-rotating propeller shafts of a deep draft ship. The deep draft ship comprising: a deep-draft hull configured to be borne by water; inner and outer propeller shafts disposed concentrically to one another and passing through the hull; apparatus for rotating the inner and outer propeller shafts in opposite directions during a forward propulsion of the ship; at least a first seal device for sealing between the outer propeller shaft and the hull to provide a substantially fluid-tight seal between the outer propeller shaft and the hull; the first seal device comprising a plurality of first seal elements disposed about the outer propeller shaft; each of the plurality of first seal elements being disposed in contact with the outer propeller shaft in spaced apart relationship with at least one other of the first seal elements; at least two of the plurality of first seal elements being disposed to define at least one intermediate space therebetween: at least a second seal device for sealing between the inner and outer propeller shafts to provide a fluid-tight seal between the inner and outer propeller shafts; the second seal device comprising a plurality of second seal elements disposed about the inner propeller shaft; each of the plurality of second seal elements being disposed in contact with the inner propeller shaft in spaced apart relationship with at least one other of the second seal elements; and at least two of the plurality of second seal elements being disposed to define at least one intermediate space therebetween. The method comprises the step of introducing lubricating oil into at least one of: the at least one intermediate space formed between the at least two of the plurality of first sealing elements; and the at least one intermediate space formed between the at least two of the plurality of second sealing elements.

BRIEF DESCRIPTION OF THE DRAWINGS

The embodiments of the present invention are described in greater detail below with reference to the accompanying drawings, in which:

FIG. 1a generally shows a stern tube with a propeller;

FIGS. 2a and 3a are illustrations, on an enlarged scale, of two different embodiments of the inner shaft seal as illustrated in FIG. 1.

DESCRIPTION OF THE PREFERRED EMBODIMENTS

Figure 1:
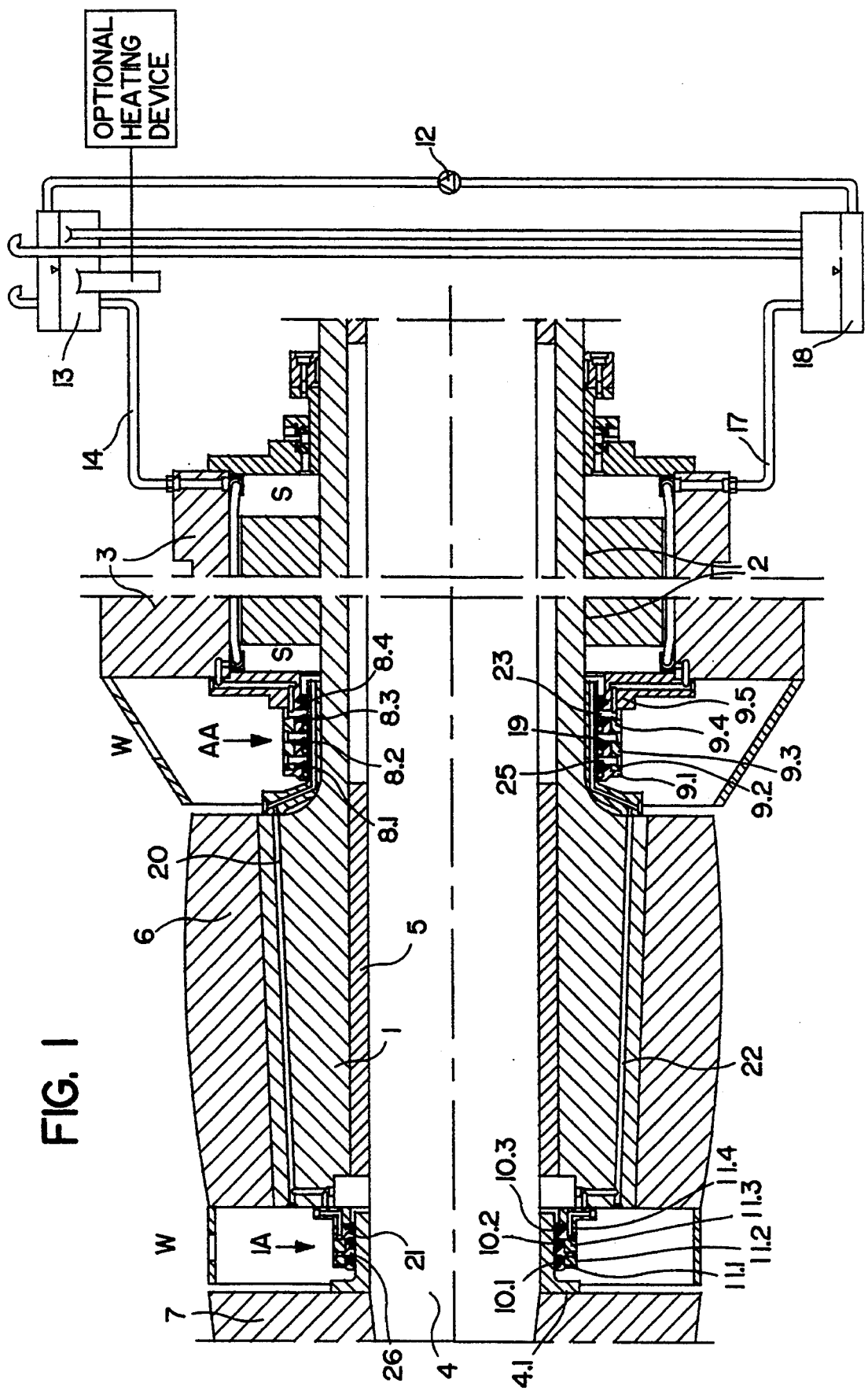
FIG. 1 is a schematic illustration of the complete circuit of a forced feed lubrication system according to the present invention.

FIG. 1a generally shows the bottom rear portion of a hull of a ship with propellers 1a'. Extending rearwardly from the hull is a stern tube 1'. The propeller shaft 1b' passes from the interior of the ship and to the exterior thereof through the stern tube 1'. The propeller 1a' can be affixed to the end of the shaft 1b'. An alternative embodiment of a stern tube and propeller arrangement is shown in FIG. 1, wherein there are two concentric propeller shafts 1 and 4, along with two propellers, generally represented by 6 and 7.

In FIG. 1, a hollow outer shaft 1 is shown mounted, preferably by means of friction bearings 2, so that it can rotate in the stern tube 3. The stern tube 3 is preferably rigidly connected to the hull of the ship. Inside the outer shaft 1, an inner shaft 4 can be mounted in a friction bearing 5 so that it can rotate. Rigidly connected to the outer shaft 1 there can be an outer propeller, of which only the hub area 6 is shown. The inner shaft 4 can support an inner propeller 7, which is also indicated only schematically.

Figure 2:
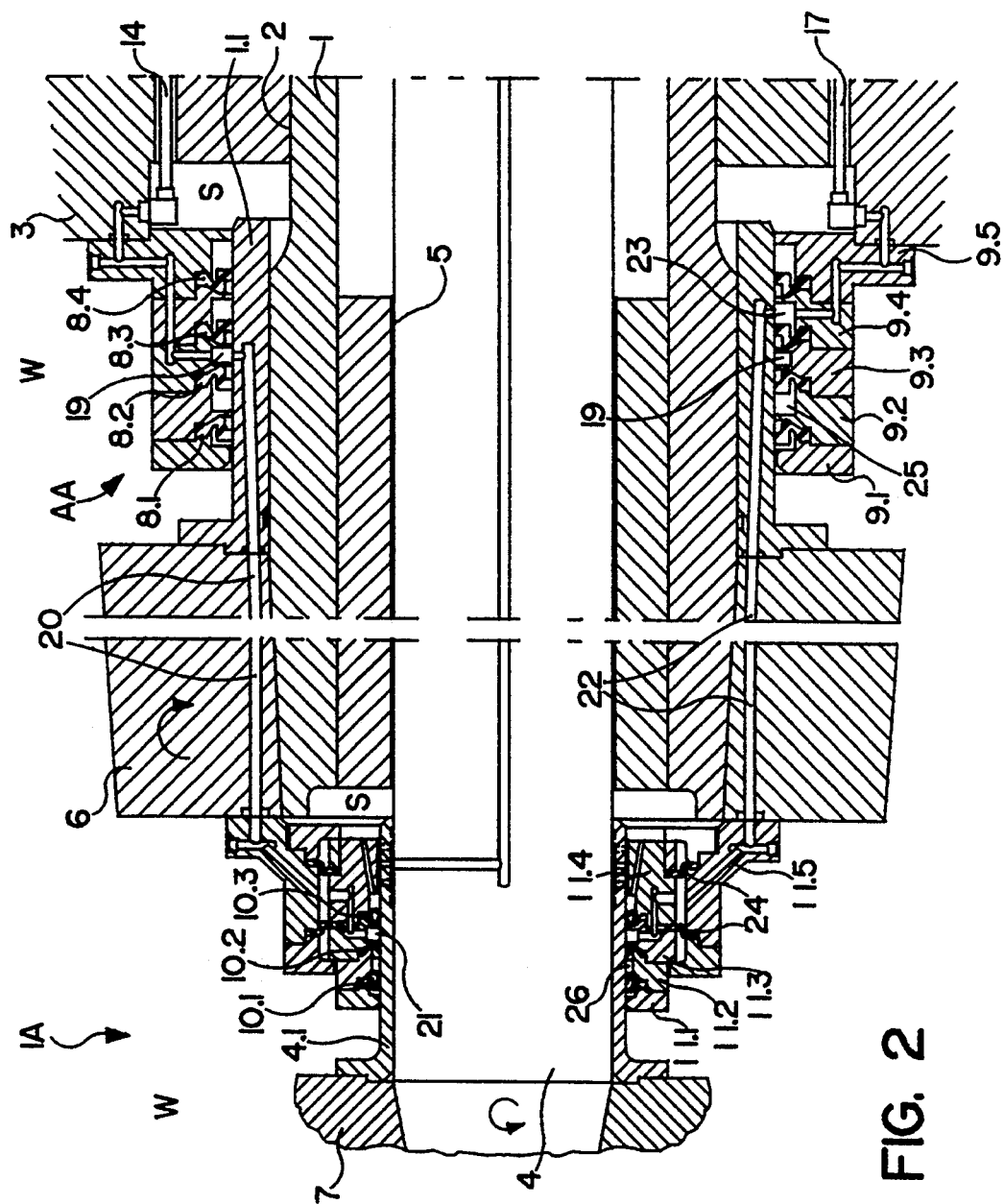
FIG. 2 is a more detailed drawing of the vicinity of the two seals illustrated in FIG. 1.

As illustrated in FIGS. 1 and 2, an outer shaft seal AA, can be equipped with preferably four lip seals 8.1–8.4, the sealing lips of which can interact with a shaft bushing 1.1 pulled over the outer shaft 1.

Of the lip seals 8.1–8.4, preferably the two outer seals 8.1 and 8.2 can be disposed to face the outside water W, and the two inner seals 8.3 and 8.4 can be disposed to face the bearing lubricating oil chamber S. Each of the lip seals can preferably be mounted between two housing rings 9.1–9.5, which can preferably be combined into a block and can be rigidly connected to the stern tube 3. Also as illustrated in FIGS. 1 and 2, an inner shaft seal IA, can preferably be equipped with three lip seals 10.1–10.3, which, with their sealing lips, can interact with a shaft bushing 4.1 pulled over the inner shaft 4.

Of the lip seals 10.1–10.3, preferably the two outer seals 10.1 and 10.2 can be disposed to face the outside water W, and the inner seal 10.3 can be disposed to face the bearing lubricating oil chamber S. These seals can also each be mounted between two housing rings 11.1–11.4, which can be combined into a block.

The block of housing rings 11.1–11.4 can preferably be connected, for example, by means of two elastic ring walls 24, in a watertight manner, with the supporting ring 11.5. The supporting ring 11.5 can preferably be rigidly connected to the hub 6 of the outer shaft.

This elastic suspension of the inner shaft seal IA, which is discussed more fully below, can generally compensate for oscillations and differences in the clearance between the two shafts 1 and 4.

A forced feed lubrication system can preferably be integrated into the drive and seal system described above. The forced feed lubrication system can preferably originate from a pressure pump 12, having a ventilated elevated reservoir 13 connected therewith on the pressure side of the pump 12. There can preferably be a feed line 14 connected to the elevated reservoir 13, at a first end thereof and to the outer shaft seal AA, at a second end thereof. A feed line hole 20 can preferably be disposed between the feed line 14 and the inner shaft seal IA, while a return line hole 22 can be connected between the inner shaft seal IA, and a branch line 17, which branch line 17 can be connected between the outer shaft seal AA back to a ventilated elevated reservoir 18. The reservoir 18 can then be connected to the suction side of the pump 12.

Alternatively, the reservoirs 13 and 18 could conceivably be non-ventilated, thereby causing the lubricating oil to be pushed through the system entirely by the pump 12, or in a ventilated system, the pump 12 could be used to simply pump the oil from the reservoir 18 back to the reservoir 13, which reservoir 13 could be disposed at a height above both the seals and the reservoir 18 to thereby cause the fluid to flow through the seal arrangements by means of the pressure head formed by the height difference, or height of the oil above the seals. With such a configuration, having gravity feed, as depicted by FIG. 1c altering the height of the upper reservoir above the seals can alter the pressure of the oil flowing through the seals.

With reference to FIG. 2 in particular, and also to FIG. 3 the portion of the above-mentioned circuit in the vicinity of the two seals, which portion is particularly important for the present invention, is described below in greater detail.

The feed line 14, preferably originating at the elevated reservoir 13, can preferably enter the block of the outer shaft seal AA, and empty into the feed line annular space 19. The feed line hole 20 can start adjacent this annular space 19, and can preferably extend through the shaft bushing 1.1 and the hub 6 of the outer propeller into the inner shaft seal IA. Within the inner shaft seal IA, the feed line hole 20 can preferably empty into an annular space 21, preferably disposed between the lip seal 10.3 facing the bearing lubricating oil chamber S and the lip seal 10.2 adjacent to the lip seal 10.3.

From this annular space 21, but preferably offset by approximately 180 degrees in relation to the above-mentioned infeed mouth of the feed line 20, a return line hole 22 can preferably start. This return line hole 22 can preferably run through the inner shaft seal IA, back through the hub 6 of the outer propeller and the bearing bushing 1.1, and into the outer shaft seal AA. Within the outer shaft seal AA, the bearing bushing can preferably empty into the annular space 23 between the lip seals 8.3 and 8.4., which lip seals preferably both face the bearing lubricating oil chamber S. As such, this annular space into which the return line 22 empties is preferably different from the annular space from which the feed line 20 originates, thereby providing pressurized lubricant into at least two of the three intermediary annular spaces of the outer shaft seal AA.

From the annular space 23, the return branch line 17 can preferably originate. This return branch line 17 can run through the outer shaft seal AA and the stern tube 3, and can empty into a storage tank 18. This storage tank 18 can preferably De disposed at the suction side of the pump 12.

In an addition configuration, at least one of the reservoirs can be optionally equipped with a heater device (shown schematically), to adjust the temperature of the lubricating oil as a function of the water temperature.

Figure 1B:
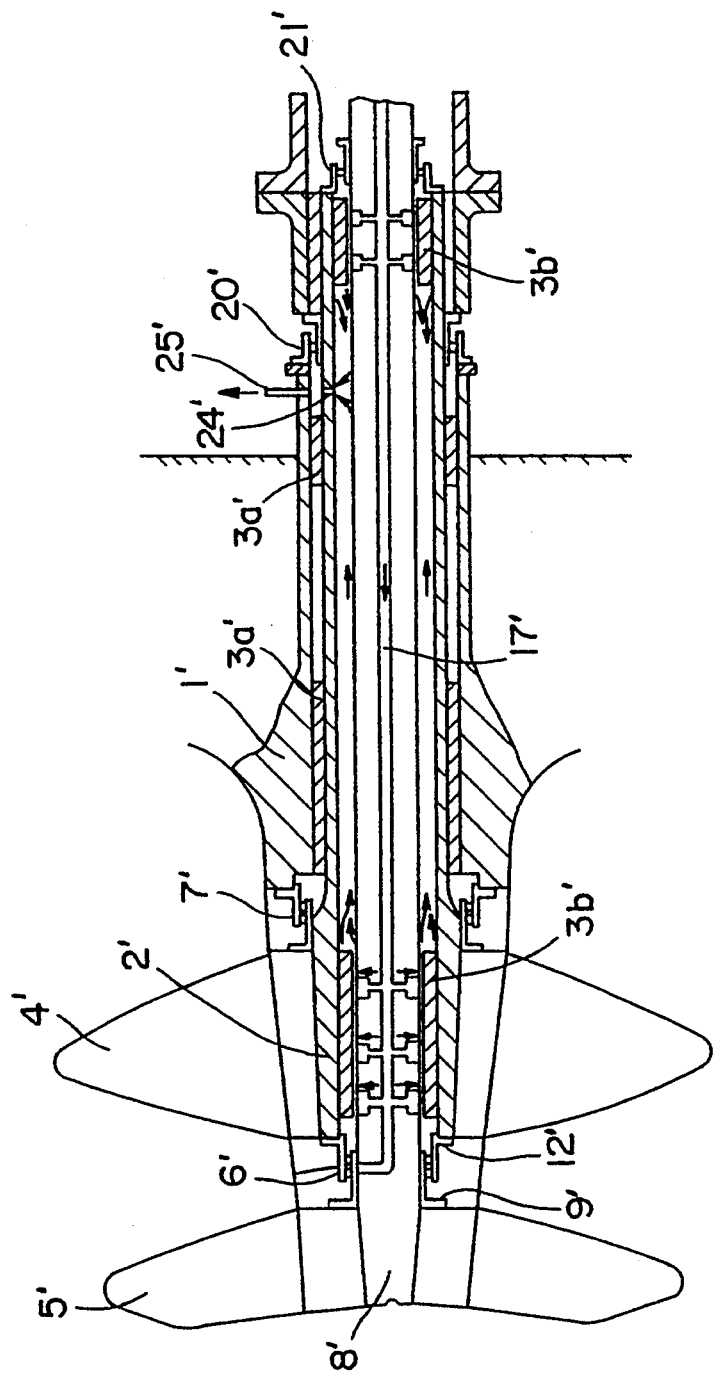
FIG. 1b shows a partial longitudinal section through the stern section of a ship with a stern tube, including an outer shaft plus an outer propeller, an inner shaft plus an inner propeller, and corresponding shaft seals and shaft bearings.
Figure 1C:
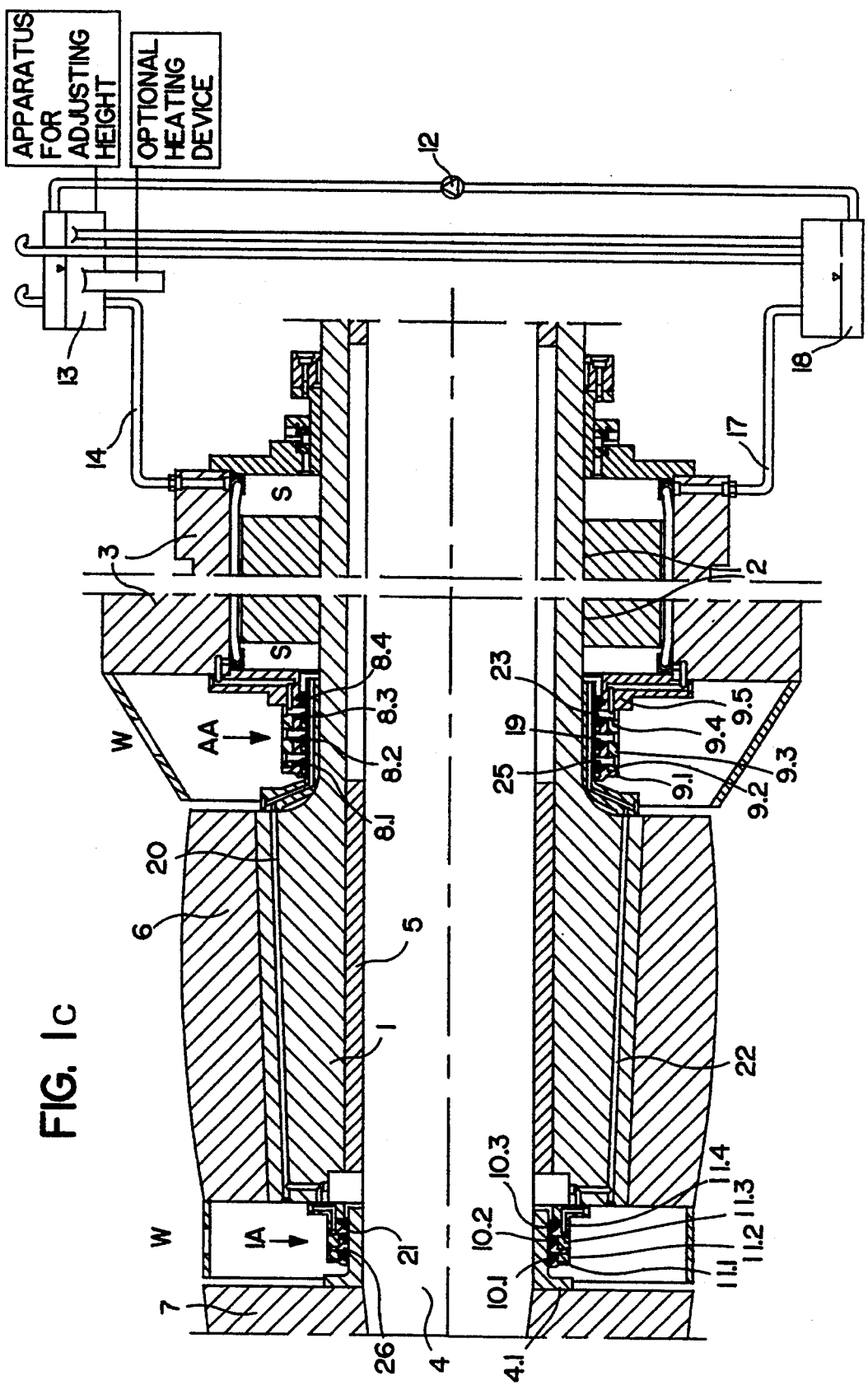
FIG. 1c shows another embodiment of a forced feed lubrication system according to the present invention.
Figure 3:
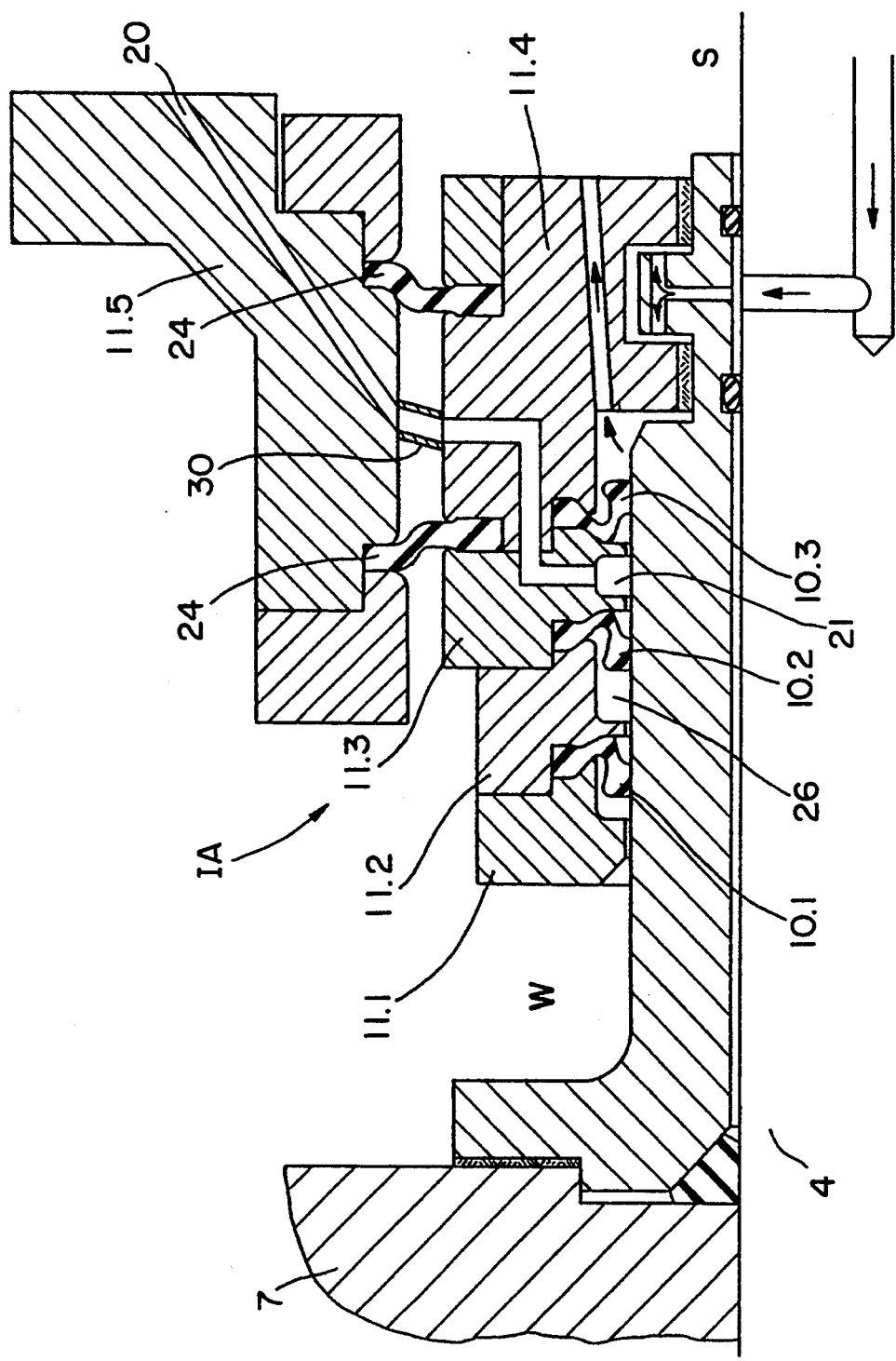
FIG. 3 shows an enlarged detail of the inner seal of FIG. 2, with a flexible connecting hose for the oil passage.
Figure 3A:
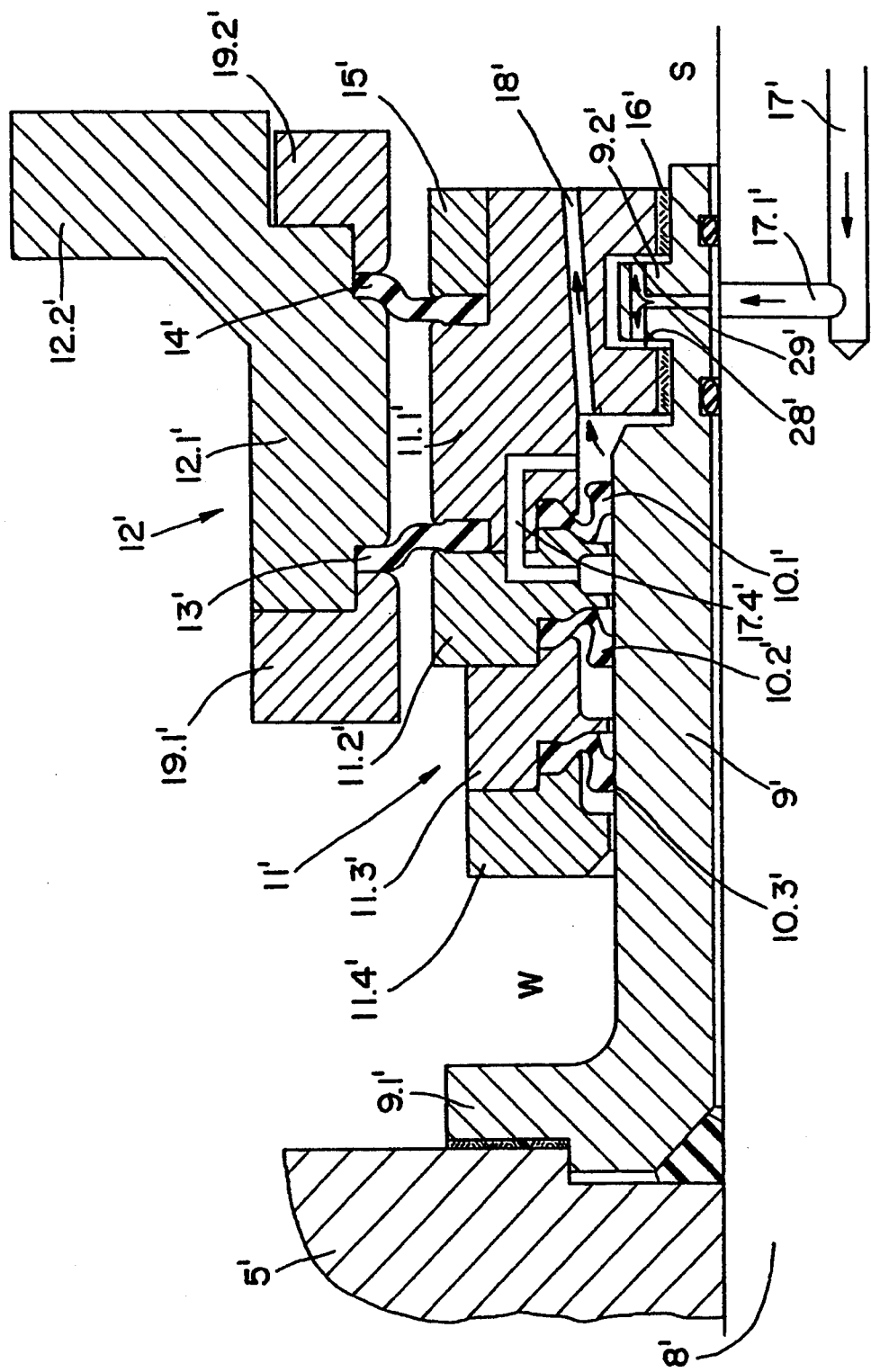

FIGS. 1b, 2a and 3a show an alternative lubrication system which can provide lubricating oil to the friction bearings, as well as to the shaft seals, while also providing a more detailed description of the inner shaft seal IA.

In FIGS. 1b, 2a and 3a, the stern tube is generally indicated as 1', and is shown with two concentric propeller shafts 2' and 8'. In this embodiment there can generally be an outer shaft 2' designed as a hollow shaft and mounted in friction bearings 3a'. Within a cavity of the outer shaft 2' an inner shaft 8' can be mounted in friction bearings 3b'. The outer shaft propeller is designated 4' and the inner shaft propeller is designated 5'. The inner shaft seal 6' can preferably be located between the two propellers 4' and 5', which are at an appropriate distance from one another, while the outer shaft seal 7' can generally be located between the outer shaft propeller 4' and the rear end of the stern tube 1'.

A shaft bushing 9' can preferably be disposed about the inner shaft 8'. This shaft bushing 9' can then preferably be torsionally connected in a conventional manner to the inner shaft propeller 5' by means of a flange 9.1'. As such, the shaft bushing 9' can essentially connect the propeller 5' to the inner shaft 8' for rotation therewith.

A typical seal arrangement for sealing about a propeller shaft can generally provide that the shaft bushing 9' be contacted by at least one sealing gasket. As shown in FIGS. 2a and 3a, three gaskets designed as lip seals 10.1', 10.2', 10.3', can preferably be disposed to contact the shaft bushing. In essence, the number of seals required can vary depending on the pressures to which the seals will be subjected, etc. The three lip seals 10.1', 10.2', and 10.3' can be located at intervals, one behind another, such that two lip seals 10.2' and 10.3' essentially correspond to and face the external medium W to be sealed out, while one lip seal 10.1' corresponds to and faces the lubricating oil chamber S. Again, the actual disposition of the lip seals, in regard to their direction of sealing, can be varied depending on the circumstances in which the seals will be used.

The lip seals 10.1', 10.2', 10.3' can preferably be supported by a housing ring 11' which can include four partial housing rings 11.1', 11.2', 11.3', 11.4'. The four partial housing rings can preferably be bolted together, one behind another, to form a block in the axial direction. Each lip seal can then be supported between and braced by two partial housing rings.

Some examples of shaft seals for sealing about propeller shafts of ships, including typical lip seals as briefly described above, can be found in the following U.S. Patents which have common inventors with the present invention: U.S. Pat. No. 4,395,141 to Günter Pietsch et al., issued on Jul. 26, 1983 and entitled "Bearing and Seal Assembly for Stern Tubes of Vessels"; U.S. Pat. No. 4,413,829 to Günter Pietsch, issued on Nov. 11, 1983 and entitled "Shaft Sealing Assembly"; U.S. Pat. No. 4,413,830 to Günter Pietsch, issued on Nov. 8, 1983 and entitled "Seal Assembly for Rotating Shafts"; U.S. Pat. No. 4,448,425 to Ernst-Peter Von Bergen, issued on May 15, 1984 and entitled "Shaft Seal Assembly with Inflatable Annular Member"; and U.S. Pat. No. 5,137,116 to Ernst-Peter Von Bergen and Günter Pietsch, issued on Aug. 11, 1992 and entitled "Sealing Device for Rotating Shaft of a Ship Propeller Shaft".

The housing ring 11' can be supported by a supporting ring 12'. Such a supporting ring could typically be rigidly mounted by means of a ring flange 12.1' onto the outer shaft 2', which outer shaft 2' is not shown in FIGS. 2a and 3a. Between the housing ring 11' and the supporting ring 12', there can generally be an annular gap 22' for allowing fluctuations between the two shafts 2' and 8' during rotation. In order to minimize the fluctuations of this clearance, or annular gap 22', and provide a seal between the housing ring 11' and the supporting ring 12', the annular gap 22' can preferably be bridged by at least one essentially radial ring wall.

In FIGS. 2a and 3a, two such radial ring walls 13', 14' are shown spaced at a distance from one another. The ring walls 13' and 14' can preferably be made from an elastic, fluid-tight material, and can be clamped in a fluid tight manner to both the housing ring 11', on one end, and the supporting ring 12', on the other end. Some of the types of elastic materials which could be used to form the ring walls 13' and 14' could possibly range from an elastomer material to an elastic, or flexible metal sheet, while it is believed that an elastomeric material should preferably be the material of choice. The ring walls can preferably be clamped between two partial housing rings 11.1', 11.2' or can be clamped by clamping rings 15', 19.1', or 19.2', to clamp the ring walls 13' and 14' to either the housing ring 11' or the supporting ring 12'.

To further increase the compensation achieved by the invention in the event of excessive fluctuations of the clearance between the outer shaft 2' and the inner shaft 8', in the embodiments illustrated, there can preferably be a friction bearing 16' for the housing ring 11'. Such friction bearings are generally well known for rotating shafts, and generally have a surface in contact with the rotating shaft. The bearing shell of such a friction bearing can preferably be supported by a segment 11.1' of the forward-most partial housing ring 11'. As such, the segment 11.1' can preferably be extended forwardly along the shaft, and axially towards the shaft 8'. The friction bearing can then be disposed on this forwardly and axially extending segment to contact the shaft bushing 9' so that the bearing shell interacts with the forward area of the shaft bushing 9'.

In order to keep the friction bearings 16', 3a', 3b' etc lubricated, the friction bearings can preferably be supplied with a lubricant, such as lubricating oil, or any other appropriate lubricant, by means of passages disposed within the inner shaft 8' and the outer shaft 2'. To provide an infeed for the lubricating oil, a longitudinally oriented bore 17' can be provided within the inner shaft 8'. This longitudinal passage 17' can empty via branch passages, such as passages 17.1', into the vicinity of the friction bearings. As shown, passages 17.1' empty at the inner surface of the bearing 16'. In the above-mentioned extended portion of segment 11.1', there can be a return passage 18' for the lubricating oil exiting from the friction bearing 16'. This return passage 18', along with the space between the inner shaft 8' and the outer shaft 2', can provide lubricating oil to the space between the outer shaft 2' and the stern tube 1' via at least one orifice 24' in the wall of the inner shaft 8' (see FIG. 1). The oil can then flow out of the outer space between the outer shaft 2' and the stern tube 1' via outlet 25' to return the lubricating oil back to a circulating pump (not shown).

One additional type of lubricating system for a sealing arrangement of a propeller shaft is disclosed in the above mentioned U.S. Pat. No. 5,137,116.

For the above-mentioned compensation for clearance fluctuations, essentially only the displacement of the housing ring 11' in the radial direction is desired. As discussed, this is essentially made possible as a result of the elastic ring walls 13', 14'. However, without additional guides, displacement in the axial direction may also occur. In order to preferably avoid such axial displacement, at least one corresponding guide, extending in the radial direction, can be provided for the housing ring 11'. Such a guide, as illustrated in FIG. 2a, can essentially be formed by a groove, or channel, which can be formed by the supporting ring 12' and its clamping rings 19.1', 19.2', and a corresponding projection, formed by the partial housing rings 11.1', 11.2', which projection essentially projects into the channel while maintaining a slight lateral clearance from the base of the channel. As illustrated in FIG. 2a, the projection-channel guide arrangement provides a pair of adjoining axial guide surfaces illustrated at 26' and 27'.

As illustrated in FIG. 3a, such a guide could also be formed by a projection 9.2' of the shaft bushing 9', which projection can preferably be disposed in the vicinity of the friction bearing 16', and a corresponding groove or channel located in the extended area of the partial housing ring 11.1'. In this embodiment of FIG. 3a, the projection-channel guide arrangement provides a pair of adjoining axial guide surfaces illustrated at 28' and 29'. With such an arrangement, the projection 9.2' can still be configured to contain branch lubricant carrying passages and thus can also act as a means for the transmission of the lubricant to the friction bearing 16'.

As further shown in FIGS. 2a and 3a, the oil passage 17', which provides lubricating oil to the friction bearings, as discussed above, can also have an additional branch passage such as passage 17.3' in FIG. 2a or passage 17.4' in FIG. 3a, for providing lubricating oil to the annular space between lip seals 10.1' and 10.2'. As such, it could be conceivable that a single pump source could provide lubricating oil under pressure to both the friction bearings and the lip seals to provide a proper lubrication and cooling of both the friction bearings and seals. Of course, alternative oil line configurations which can either independently, or simultaneously provide pressurized oil to both the friction bearings and the lip seals can also be constructed within the propeller shaft parts, and would be within the skill of the artisan in the field.

One feature of the invention resides broadly in the lubrication system for seals of propeller drive systems for ships with two concentric propeller shafts rotating in opposite directions to one another, with a seal for the outer shaft and a seal for the inner shaft, whereby the outer shaft seal is connected to the stern tube and the inner shaft seal is connected to the hub of the outer propeller in a water-tight manner, and whereby the seals are supplied with lubricating oil from a central location, characterized by the-fact that when the seals are designed each with at least three individual seals at some distance from one another in the axial direction, preferably lip seals, the lubricating oil supply is designed as a separate forced feed lubrication, consisting of a feed line 14 coming from the pressure source 12 through the outer shaft seal AA, emptying into one of the annular spaces 19, 23, 25 between two adjacent individual seals 8.1–8.4 of the outer shaft seal AA, also consisting of a feed line hole 20 which runs through the outer shaft 1 or a shaft bushing 1.1 corresponding to it, and the hub 6 of the outer propeller, whereby one end of the hole empties into the above mentioned annular space 19, 23, 25, and the other end empties into one of the annular spaces 21, 26 between the neighboring individual seals 10.1–10.3 of the inner shaft seal IA, also consisting of a return line hole 22 which runs through the hub 6 of the outer propeller and the outer shaft 1 of a shaft bushing 1.1 corresponding to it, essentially oriented diametrically to the feed line hole 20, one end of which empties into one of the above-mentioned annular spaces 21, 26 of the inner shaft seal IA, and the other end of which empties into another annular space 19, 23, 25 between neighboring individual seals 8.1–8.4 of the outer shaft seal AA, and finally of a passage 17 which, starting from one of the annular spaces 19, 23 25 runs through the outer shaft seal AA and the stern tube 3 to the pump 12.

Another feature of the invention resides broadly in the lubrication system, characterized by the fact that the outer shaft seal AA is designed as a quadruple seal with two individual seals 8.1, 8.2 facing the outside water W to be sealed out, and two individual seals 8.3, 8.4 facing the bearing lubricating oil chamber S to be sealed, and the inner shaft seal IA is designed as a triple seal with two individual seals 10.1, 10.2 facing the outside water W to be sealed out, and one individual seal 10.3 facing the bearing lubricating oil chamber S.

Yet another feature of the invention resides broadly in the lubrication system, characterized by the fact that the annular space 19 is located between the individual seal pairs 8.1, 8.2 and 8.3, 8.4 of the outer shaft seal AA, the annular space 21 is located between the individual seal 10.3 facing the bearing lubricating oil chamber S and the adjacent individual seal 10.2, and the annular space 23 is located between the two individual seals 8.3, 8.4 of the outer shaft seal facing the bearing lubricating oil chamber S.

Still another feature of the invention resides broadly in the lubrication system, characterized by the fact that when the pressure source is designed as a pump 12, a ventilated elevated reservoir 13 is connected to it on the pressure side, and a ventilated storage tank 18 is connected to it on the suction side.

Still yet another feature of the invention resides broadly in the lubrication system, characterized by the fact that when an inner shaft seal IA is used, whose individual seals 10.1–10.3 are mounted, or supported, by a block of housing rings 11.1–11.4, connected by means of elastic ring-shaped walls 24 which prevent the penetration of fluid with a supporting ring, or retaining ring 11.5 fastened to the hub 6 of the outer shaft, the feed line to the space 21 between the housing ring block and the supporting ring can be bridged by means of a flexible watertight hose 30 as shown in FIG. 3. Similarly, diametrically opposite to the feed line 20, a similar watertight hose 30 could be positioned for the return line 22.

All, or substantially all, of the components and methods of the various embodiments may be used with at least one embodiment or all of the embodiments, if any, described herein.

All of the patents, patent applications and publications recited herein, if any, and on the Declaration attached to this application, are hereby incorporated by reference as if set forth in their entirety herein.

The corresponding foreign patent publication applications, namely, Federal Republic of Germany Patent Application No. P 42 32 753, filed on Sep. 30, 1992, having inventors Ernst-Peter Von Bergen and Günter Pietsch, and DE-OS P 42 32 753 and DE-PS P 42 32 753, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A ship comprising:
    a deep-draft hull configured to be borne by water;
    engine means disposed within the hull for generating mechanical power to move the ship;
    inner and outer propeller shaft means disposed concentrically to one another and passing through the hull for receiving mechanical power from the engine to move the ship;
    friction bearings disposed between said outer and inner propeller shaft means;
    a lubricating system for supplying lubricant to said friction bearing;
    transmission means for connecting each of said inner and outer propeller shaft means to the engine means, the transmission being configured for rotating said inner and outer propeller shaft means in opposite directions during a forward propulsion of the ship;
    at least first seal means for sealing between the outer propeller shaft means and the hull to provide a substantially fluid-tight seal between the outer propeller shaft means and the hull, said first seal means comprising:
        a plurality of first seal elements disposed about said outer propeller shaft means;
        each of said plurality of first seal elements being disposed in contact with said outer propeller shaft means in spaced apart relationship with at least one other of said first seal elements;

at least two of said plurality of first seal elements being disposed to define at least one intermediate space therebetween; and a first seal housing for retaining said plurality of first seal elements, said first seal housing being fastened to the hull of the ship;

at least second seal means for sealing between the inner and outer propeller shaft means to provide a fluid-tight seal between the inner and outer propeller shaft means, said second seal means comprising:

a plurality of second seal elements disposed about said inner propeller shaft means;

each of said plurality of second seal elements being disposed in contact with said inner propeller shaft means in spaced apart relationship with at least one other of said second seal elements;

at least two of said plurality of second seal elements being disposed to define at least one intermediate space therebetween;

a second seal housing for retaining said plurality of second seal elements, said second seal housing being fastened to said outer propeller shaft means; means for supplying lubricating oil into each of:

said at least one intermediate space formed between said at least two of said plurality of first sealing elements; and said at least one intermediate space formed between said at least two of said plurality of second sealing elements;

said lubricating system for said friction bearings being separate from said means for supplying lubricating oil to said intermediate spaces;

said means for supplying lubricating oil comprising:

means for supplying the lubricating oil under pressure to each said at least one intermediate space to flow lubricating oil through each said at least one intermediate space;

first passage means for transporting the lubricating oil from said pressure means to said at least one intermediate space of said first seal means;

second passage means for transporting the lubricating oil from said at least one intermediate space of said first seal means to said at least one intermediate space of said second seal means;

third passage means for transporting the lubricating oil from said at least one intermediate space of said second seal means to at least one intermediate space of said first seal means; and fourth passage means for transporting the lubricating oil from said at least one intermediate space of said first seal means to said pressure means;

said third passage means is configured to transport the lubricating oil from said at least one intermediate space of said second seal means to at least one intermediate space of said first seal means different from said at least one intermediate space into which said first passage is disposed;

said means for supplying lubricating oil comprises at least a first reservoir for storing lubricating oil therein;

said first passage means comprises a passage from said at least a first reservoir through said first seal housing to said at least one intermediate space of said first seal means;

said fourth passage means comprises a passage from said at least one different intermediate space through said first seal housing to said at least a first reservoir;

said second passage means comprises a first passage portion disposed within said outer propeller shaft means and a second passage portion disposed through said second housing means;

said third passage means comprises a third passage portion disposed through said second housing means and a fourth passage portion disposed within said outer propeller shaft means;

said third passage means is disposed substantially diametrically opposite to said second passage means within said second housing means and said outer propeller shaft means.

2. The ship according to claim 1, wherein:

said first seal means comprises four of said first seal elements, said four of said first seal elements being arranged substantially linearly along said outer propeller shaft means and sequentially comprise a first of said first seal elements, a second of said first seal elements, a third of said first seal elements and a fourth of said first seal elements;

said first and said second of said first seal elements being configured to keep water out of the hull, and said third and said fourth of said first seal elements being configured to seal in lubricating oil;

said second seal means comprises three of said second seal elements, said three of said second seal elements being arranged substantially linearly along said inner propeller shaft means and sequentially comprise a first of said second seal elements, a second of said second seal elements, and a third of said second seal elements; and said first and said second of said second seal elements being configured to keep water out from between said inner and said outer propeller shaft means, and said third of said second seal elements being configured to seal in lubricating oil.

3. The ship according to claim 2, wherein:

said at least one intermediate space of said first seal means comprises an intermediate space disposed between said second and said third of said first seal elements;

said at least one different intermediate space of said first seal means comprises an intermediate space disposed between said third and said fourth of said first seal elements;

said at least one intermediate space of said second seal means comprises an intermediate space disposed between said second and said third of said second seal elements.

4. The ship according to claim 3, wherein:

said ship comprises one of: an ocean-going vessel and a great lakes vessel;

said first and said second seal elements comprise lip seals;

said means for supplying lubricating oil comprises a second reservoir, and a pump means;

said fourth passage means is configured to empty into said second reservoir;

said pump means is configured to pump lubricating oil from said second reservoir to said first reservoir;

said first reservoir is configured to supply lubricating oil into said first passage means;

said first and said second reservoirs comprise reservoirs vented to the atmosphere;

said first reservoir is disposed at a position substantially vertically above a position of said second reservoir at a height above said second reservoir to establish a pressure head of the oil between the reservoirs;

said means for supplying lubricating oil being configured to flow lubricating oil through said first and said second seal means under gravity flow of the lubricating oil from said first reservoir to said second reservoir;

said first reservoir being height adjustable with respect to said second reservoir to alter the pressure of the flow of oil to said seal means;

said means for supplying lubricating oil further comprises heating means for adjusting a temperature of the lubricating oil;

said outer propeller shaft means has a first end disposed away from the ship;

said outer propeller shaft means comprises a supporting ring disposed about said inner propeller shaft means and attached to said first end of said outer propeller shaft means;

said second housing means is disposed radially inwardly of said supporting ring;

said supporting ring comprising at least two flexible ring-shaped walls connected to and extending between said supporting ring and said second housing means;

said at least two flexible ring-shaped walls being configured to maintain a space between said supporting ring and said second housing means, said space being for compensation of relative movement between said inner and said outer propeller shaft means;

said second portion of said second passage means passes through said supporting ring from said outer propeller shaft means to said space, and from said space through said second housing means to said at least one intermediate space of said second seal means;

said supporting ring further comprises a first flexible tube disposed across said space to connect said second portion of said second passage means from said supporting ring to said second housing means;

said third portion of said third passage means passes through said second housing means to said space, and from said space through said supporting ring to said fourth portion of said third passage means;

said supporting ring further comprises a second flexible tube disposed across said space to connect said second portion of said second passage means from said second housing means to said supporting ring;

said outer propeller shaft means comprises an outer propeller shaft with a first shaft bushing disposed thereabout between said outer propeller shaft and said first seal means, said first seal elements being disposed in contact with said first shaft bushing;

said inner propeller shaft comprises an inner propeller shaft with a second shaft bushing disposed thereabout between said inner propeller shaft and said second seal means, said second seal elements being disposed in contact with said second shaft bushing;

said outer propeller shaft means comprises a first propeller disposed adjacent said first end thereof, said first propeller having a hub portion disposed adjacent said outer propeller shaft;

said first passage portion of said second passage means passes longitudinally through said first shaft bushing and said hub of said first propeller;

said first housing means and said second housing means each comprises a plurality of ring shaped housing components;

each of said first seal elements and said second seal elements are disposed between ones of said ring shaped housing components;

said ring shaped housing components are fastened together to form a housing block; and said lubricating system for the friction bearing comprises a longitudinal passage disposed within said inner propeller shaft along at least a portion of the length of the inner propeller shaft, and at least one transverse passage disposed from said longitudinal passage to said friction bearings.

5. A propeller assembly for a deep draft ship, the deep draft ship having a hull for being borne by water, and said propeller assembly comprising:

inner and outer propeller shaft means disposed concentrically to one another and passing through the hull, said inner and outer propeller shaft means being configured to rotate in opposite directions during forward propulsion of the ship to propel the ship through water;

friction bearing disposed between said outer and inner propeller shaft means;

a lubricating system for supplying lubricant to said friction bearing;

at least first seal means for sealing between the outer propeller shaft means and the hull to provide a substantially fluid-tight seal between the outer propeller shaft means and the hull, said first seal means comprising:

a plurality of first seal elements disposed about said outer propeller shaft means;

each of said plurality of first seal elements being disposed in contact with said outer propeller shaft means in spaced apart relationship with at least one other of said first seal elements;

at least two of said plurality of first seal elements being disposed to define at least one intermediate space therebetween;

a first seal housing for retaining said plurality of first seal elements;

said first seal housing for being fastened to the hull of a ship;

at least second seal means for sealing between the inner and outer propeller shaft means to provide a fluid-tight seal between the inner and outer propeller shaft means, said second seal means comprising:

a plurality of second seal elements disposed about said inner propeller shaft means;

each of said plurality of second seal elements being disposed in contact with said inner propeller shaft means in spaced apart relationship with at least one other of said second seal elements;

at least two of said plurality of second seal elements being disposed to define at least one intermediate space therebetween;

a second seal housing for retaining said plurality of second seal elements;

said second seal housing being fastened to said outer propeller shaft means;

means for supplying lubricating oil into said at least one intermediate space of each of said first seal means and said second seal means;

said lubricating system for said friction bearings being separate from said means for supplying lubricating oil to said intermediate spaces;

said means for supplying lubricating oil comprises means for supplying the lubricating oil under pressure to said at least one intermediate space of each of said first and second seal means to flow lubricating oil through said at least one intermediate space of said first and second seal means;

said means for supplying lubricating oil comprises:
first passage means for transporting the lubricating oil from said pressure means to said at least one intermediate space of said first seal means;
second passage means for transporting the lubricating oil from said at least one intermediate space of said first seal means to said at least one intermediate space of said second seal means;
third passage means for transporting the lubricating oil from said at least one intermediate space of said second seal means to at least one intermediate space of said first seal means; and
fourth passage means for transporting the lubricating oil from said at least one intermediate space of said first seal means to said pressure means; and
at least a first reservoir for storing lubricating oil therein;

said third passage means is configured to transport the lubricating oil from said at least one intermediate space of said second seal means to at least one intermediate space of said first seal means different from said at least one intermediate space into which said first passage is disposed;

said first passage means comprises a passage from said at least a first reservoir through said first seal housing to said at least one intermediate space of said first seal means;

said fourth passage means comprises a passage from said at least one different intermediate space through said first seal housing to said at least a first reservoir;

said second passage means comprises a first passage portion disposed within said outer propeller shaft means and a second passage portion disposed through said second housing means;

said third passage means comprises a third passage portion disposed through said second housing means and a fourth passage portion disposed within said outer propeller shaft means; and said third passage means is disposed substantially diametrically opposite to said second passage means within said second housing means and said outer propeller shaft means.

6. The propeller assembly according to claim 5, wherein:
said first seal means comprises four of said first seal elements, said four of said first seal elements being arranged substantially linearly along said outer propeller shaft means and sequentially comprise a first of said first seal elements, a second of said first seal elements, a third of said first seal elements and a fourth of said first seal elements;
said first and said second of said first seal elements being configured to keep water out of the hull, and said third and said fourth of said first seal elements being configured to seal in lubricating oil;
said second seal means comprises three of said second seal elements, said three of said second seal elements being arranged substantially linearly along said inner propeller shaft means and sequentially comprise a first of said second seal elements, a second of said second seal elements, and a third of said second seal elements; and
said first and said second of said second seal elements being configured to keep water out from between said inner and said outer propeller shaft means, and said third of said second seal elements being configured to seal in lubricating oil.

7. The propeller assembly according to claim 6, wherein:
said at least one intermediate space of said first seal means comprises an intermediate space disposed between said second and said third of said first seal elements;
said at least one different intermediate space of said first seal means comprises an intermediate space disposed between said third and said fourth of said first seal elements;
said at least one intermediate space of said second seal means comprises an intermediate space disposed between said second and said third of said second seal elements.

8. The propeller assembly according to claim 7, wherein:
said first and said second seal elements comprise lip seals;
said means for supplying lubricating oil comprises a second reservoir, and a pump means;
said fourth passage means is configured to empty into said second reservoir;
said pump means is configured to pump lubricating oil from said second reservoir to said first reservoir;
said first reservoir is configured to supply lubricating oil into said first passage means;
said first and said second reservoirs comprise reservoirs vented to the atmosphere;
said first reservoir is disposed at a position substantially vertically above a position of said second reservoir at a height above said second reservoir to establish a pressure head of the oil between the reservoirs;
said means for supplying lubricating oil being configured to flow lubricating oil through said first and said second seal means under gravity flow of the lubricating oil from said first reservoir to said second reservoir;
said first reservoir being height adjustable with respect to said second reservoir to alter the pressure of the flow of oil to said seal means;
said means for supplying lubricating oil further comprises heating means for adjusting a temperature of the lubricating oil;
said outer propeller shaft means has a first end disposed away from the ship;
said outer propeller shaft means comprises a supporting ring disposed about said inner propeller shaft means and attached to said first end of said outer propeller shaft means;
said second housing means is disposed radially inwardly of said supporting ring;
said supporting ring comprising at least two flexible ring-shaped walls connected to and extending between said supporting ring and said second housing means;
said at least two flexible ring-shaped walls being configured to maintain a space between said supporting ring and said second housing means, said space being for compensation of relative movement between said inner and said outer propeller shaft means;

said second portion of said second passage means passes through said supporting ring from said outer propeller shaft means to said space, and from said space through said second housing means to said at least one intermediate space of said second seal means;

said supporting ring further comprises a first flexible tube disposed across said space to connect said second portion of said second passage means from said supporting ring to said second housing means;

said third portion of said third passage means passes through said second housing means to said space, and from said space through said supporting ring to said fourth portion of said third passage means;

said supporting ring further comprises a second flexible tube disposed across said space to connect said second portion of said second passage means from said second housing means to said supporting ring;

said outer propeller shaft means comprises an outer propeller shaft with a first shaft bushing disposed thereabout between said outer propeller shaft and said first seal means, said first seal elements being disposed in contact with said first shaft bushing;

said inner propeller shaft means comprises an inner propeller shaft with a second shaft bushing disposed thereabout between said inner propeller shaft and said second seal means, said second seal elements being disposed in contact with said second shaft bushing;

said outer propeller shaft means comprises a first propeller disposed adjacent said first end thereof, said first propeller having a hub portion disposed adjacent said outer propeller shaft;

said first passage portion of said second passage means passes longitudinally through said first shaft bushing and said hub of said first propeller;

said first housing means and said second housing means each comprises a plurality of ring shaped housing components;

each of said first seal elements and said second seal elements are disposed between ones of said ring shaped housing components;

said ring shaped housing components are fastened together to form a housing block; and said lubricating system for the friction bearing comprises a longitudinal passage disposed within said inner propeller shaft along at least a portion of the length of the inner propeller shaft, and at least one transverse passage disposed from said longitudinal passage to said friction bearings.

9. A method for lubricating seal elements of counter-rotating propeller shafts of a deep draft ship, the deep draft ship comprising: a deep-draft hull configured to be borne by water; inner and outer propeller shaft means disposed concentrically to one another and passing through the hull; friction bearings disposed between said outer and inner propeller shaft means; a lubricating system for supplying lubricant to said friction bearings; means for rotating said inner and outer propeller shaft means in opposite directions during a forward propulsion of the ship; at least first seal means for sealing between the outer propeller shaft means and the hull to provide a substantially fluid-tight seal between the outer propeller shaft means and the hull; said first seal means comprising a plurality of first seal elements disposed about said outer propeller shaft means, and a first seal housing for retaining said plurality of first seal elements, said first seal housing being fastened to the hull of the ship; each of said plurality of first seal elements being disposed in contact with said outer propeller shaft means in spaced apart relationship with at least one other of said first seal elements; at least two of said plurality of first seal elements being disposed to define at least one intermediate space therebetween; at least second seal means for sealing between the inner and outer propeller shaft means to provide a fluid-tight seal between the inner and outer propeller shaft means; said second seal means comprising a plurality of second seal elements disposed about said inner propeller shaft means, and a second seal housing for retaining said plurality of second seal elements, said second seal housing being fastened to said outer propeller shaft means; each of said plurality of second seal elements being disposed in contact with said inner propeller shaft means in spaced apart relationship with at least one other of said second seal elements; and at least two of said plurality of second seal elements being disposed to define at least one intermediate space therebetween; a lubricating oil supply source; and means for supplying lubricating oil under pressure directly from said lubricating oil supply source into both of said at least one intermediate space formed between said at least two of said plurality of first sealing elements; and said at least one intermediate space formed between said at least two of said plurality of second sealing elemental, said lubricating system for said friction bearings being separate from said means for supply lubricating oil to said intermediate spaces; and said method comprising the steps of:

separately supplying lubricating oil to each of:
said friction bearings; and
at least one of: said at least one intermediate space formed between said at least two of said plurality of first sealing elements, and said at least one intermediate space formed between said at least two of said plurality of second sealing elements;

said separate supplying of lubricating oil to an intermediate space comprises:
supplying lubricating oil under pressure directly from said lubricating oil supply source to said at least one intermediate space of said first seal means; and
supplying lubricating oil under pressure from said at least one intermediate space of said first seal means directly into said at least one intermediate space of said second seal means; and
said supplying of lubricating oil further comprises the steps of:
transporting the lubricating oil from said oil supply source through first passage means to at least one first intermediate space of said first seal means, said first passage means comprising a passage from said oil supply source through said first seal housing to said at least one intermediate space of said first seal means;
transporting the lubricating oil from said at least one first intermediate space of said first seal means through second passage means to said at least one intermediate space of said second seal means, said second passage means comprises a first passage portion disposed within said outer propeller shaft means and a second passage portion disposed through said second housing means;

transporting the lubricating oil from said at least one intermediate space of said second seal means through third passage means to at least one second intermediate space of said first seal means, said third passage means comprises a third passage portion disposed through said second housing means and a fourth passage portion disposed within said outer propeller shaft means, said third passage means being disposed substantially diametrically opposite to said second passage means within said second housing means and said outer propeller shaft means; and transporting the lubricating oil from said at least one second intermediate space of said first seal means through fourth passage means back to said oil supply source, said fourth passage means comprises a passage from said at least one second intermediate space through said first seal housing back to said oil supply source.

10. The method according to claim 9, wherein: said oil supply source comprises:

a first reservoir for supplying lubricating oil into said first passage means;

a second reservoir for receiving lubricating oil from said fourth passage means; and pump means for pumping the lubricating oil from said second reservoir to said first reservoir;

said first seal means comprises four of said first seal elements, said four of said first seal elements being arranged substantially linearly along said outer propeller shaft means and sequentially comprise a first of said first seal elements, a second of said first seal elements, a third of said first seal elements and a fourth of said first seal elements;

said first and said second of said first seal elements being configured to keep water out of the hull, and said third and said fourth of said first seal elements being configured to seal in lubricating oil;

said second seal means comprises three of said second seal elements, said three of said second seal elements being arranged substantially linearly along said inner propeller shaft means and sequentially comprise a first of said second seal elements, a second of said second seal elements, and a third of said second seal elements; and said first and said second of said second seal elements being configured to keep water out from between said inner and said outer propeller shaft means, and said third of said second seal elements being configured to seal in lubricating oil; and said method further comprises the steps of:

supplying lubricating oil from first reservoir means through said first passage means into an intermediate space disposed between said second and said third of said first seal elements;

supplying lubricating oil from said third passage means into an intermediate space disposed between said third and said fourth of said first seal elements; and supplying lubricating oil from said second passage means into an intermediate space disposed between said second and said third of said second seal elements.

11. The method according to claim 10, wherein said method further comprises the steps of:

configuring said first and said second seal elements as lip seals;

venting said first and said second reservoirs to the atmosphere;

disposing said first reservoir at a position substantially vertically above a position of said second reservoir;

flowing lubricating oil through said first and said second seal means under gravity flow of the lubricating oil from said first reservoir to said second reservoir;

adjusting a height of said first reservoir with respect to said second reservoir to vary the pressure head of the oil within the reservoirs and alter the pressure of the flow of oil to said seal means;

configuring said outer propeller shaft means with a first end disposed away from the ship;

disposing a supporting ring about said inner propeller shaft means and attaching said supporting ring to said first end of said outer propeller shaft means, said supporting ring comprising at least two flexible ring-shaped walls connected thereto;

supporting said second housing means radially inwardly of, and spaced apart from said supporting ring on said at least two flexible ring-shaped walls to compensate for relative movement between said inner and said outer propeller means;

configuring said second portion of said second passage means to pass through said supporting ring from said outer propeller shaft means to said space, and from said space through said second housing means to said at least one intermediate space of said second seal means;

disposing a first flexible tube across said space to connect said second portion of said second passage means from said supporting ring to said second housing means;

configuring said third portion of said third passage means to pass through said second housing means to said space, and from said space through said supporting ring to said fourth portion of said third passage means;

disposing a second flexible tube across said space to connect said second portion of said second passage means from said second housing means to said supporting ring;

configuring said outer propeller shaft means to comprise an outer propeller shaft and a first shaft bushing disposed about said outer propeller shaft between said outer propeller shaft and said first seal means, said first seal elements being disposed in contact with said first shaft bushing;

configuring said inner propeller shaft means to comprise an inner propeller shaft and a second shaft bushing disposed about said inner propeller shaft between said inner propeller shaft and said second seal means, said second seal elements being disposed in contact with said second shaft bushing;

disposing a first propeller adjacent said first end of said outer propeller shaft, said first propeller having a hub portion disposed adjacent said outer propeller shaft;

configuring said first passage portion of said second passage means to pass longitudinally through said first shaft bushing and said hub of said first propeller;

configuring said first housing means and said second housing means to each comprise a plurality of ring shaped housing components;

disposing each of said first seal elements and said second seal elements between ones of said ring shaped housing components; and fastening said ring shaped housing components together to maintain said seal elements therebetween and form a housing block.

* * * * *

UNITED STATES PATENT AND TRADEMARK OFFICE
CERTIFICATE OF CORRECTION

PATENT NO. : 5,374,208
DATED : December 20, 1994
INVENTOR(S) : Ernst-Peter von BERGEN and Günter PIETSCH It is certified that error appears in the above-indentified patent and that said Letters Patent is hereby corrected as shown below:

In column 2, line 64, after 'can', delete "De" and insert --be--.

In column 8, line 23, after 'preferably', delete "De" and insert --be--.

In column 10, line 65, after the second occurrence of 'and' insert --lip--.

In column 12, line 53, Claim 1, after 'friction', delete "bearing;" and insert --bearings;--.

In column 16, line 27, Claim 5, after 'friction', delete "bearing" and insert --bearings--.

In column 20, line 33, Claim 9, after 'for', delete "supply" and insert --supplying--.

Signed and Sealed this

Twenty-fourth Day of December, 1996

Attest:

BRUCE LEHMAN

Attesting Officer     Commissioner of Patents and Trademarks